(12) United States Patent
Schluter

(10) Patent No.: US 6,524,722 B2
(45) Date of Patent: Feb. 25, 2003

(54) CORRUGATED STRUCTURAL METAL PLATE

(75) Inventor: James C. Schluter, Franklin, OH (US)

(73) Assignee: Contech Technologies, Inc., Minneapolis, MN (US)

( * ) Notice: Subject to any disclaimer, the term of this patent is extended or adjusted under 35 U.S.C. 154(b) by 58 days.

(21) Appl. No.: 09/809,229

(22) Filed: Mar. 15, 2001

(65) Prior Publication Data

US 2002/0132130 A1 Sep. 19, 2002

(51) Int. Cl.$^7$ .............................. E04C 2/32; B21D 13/04
(52) U.S. Cl. ........................................ 428/603; 72/379.6
(58) Field of Search ................................ 428/603, 604, 428/599; 72/379.6, 369, 368

(56) References Cited

U.S. PATENT DOCUMENTS

| | | |
|---|---|---|
| 558,436 A | 4/1896 | Thomas |
| 1,056,871 A | 3/1913 | White |
| 1,350,493 A | 8/1920 | Goodrich |
| 1,517,633 A | 12/1924 | Junkers |
| 1,704,326 A | 3/1929 | Junkers |
| 1,788,248 A | 1/1931 | Rourke |
| 1,914,847 A | 6/1933 | Cushwa |
| 1,936,228 A | 11/1933 | Crafton |
| 1,982,243 A | 11/1934 | Black |
| 2,012,766 A * | 8/1935 | Meyer .................... 138/121 |
| 2,042,327 A | 5/1936 | Whitescarver |
| 2,062,686 A | 12/1936 | Toussaint |
| 2,114,834 A | 4/1938 | Foukal |
| 2,181,508 A | 11/1939 | Cushwa et al. |
| 2,181,509 A | 11/1939 | White |
| 2,217,292 A | 10/1940 | Proctor |
| 2,876,801 A * | 3/1959 | November ................. 138/121 |
| 3,146,297 A * | 8/1964 | Hahne .................... 174/102 R |
| 3,357,194 A | 12/1967 | Fisher |
| 3,417,568 A | 12/1968 | Henderson |
| 3,438,211 A | 4/1969 | Zywietz et al. |
| 3,601,995 A | 8/1971 | Seiz et al. |
| 3,731,711 A * | 5/1973 | Bauer ......................... 137/1 |
| 4,099,359 A | 7/1978 | Sivachenko |
| 4,186,541 A | 2/1980 | Sivachenko |
| 4,211,504 A | 7/1980 | Sivachenko |
| 4,247,136 A * | 1/1981 | Fouss et al. ............... 285/319 |
| 4,360,042 A | 11/1982 | Fouss et al. |
| 4,439,065 A | 3/1984 | Constapel |
| 4,465,404 A | 8/1984 | Heintzmann et al. |
| 4,862,666 A | 9/1989 | Kero |
| 4,976,289 A * | 12/1990 | Umemori et al. ........... 138/122 |
| 4,997,317 A * | 3/1991 | Schonfeld et al. ......... 405/150.1 |
| 5,046,893 A | 9/1991 | Borgnini |
| 5,295,764 A | 3/1994 | Cunat |
| 5,393,173 A | 2/1995 | Morello |
| 5,791,118 A * | 8/1998 | Jordan ...................... 428/184 |
| 6,142,188 A * | 11/2000 | Schaerfl et al. ............. 138/121 |
| 6,406,025 B1 * | 6/2002 | Westhoff et al. ............ 277/314 |

FOREIGN PATENT DOCUMENTS

| | | |
|---|---|---|
| FR | 802413 | 9/1936 |
| GB | 23736 | 5/1915 |

* cited by examiner

Primary Examiner—John J. Zimmerman
(74) Attorney, Agent, or Firm—Wood, Herron & Evans, LLP

(57) ABSTRACT

A corrugated structural metal plate includes longitudinally extending corrugations defined by alternating crests and valleys. Each of the crests and valleys includes longitudinally extending flat segments that are configured to reduce buckling of the plate when the plate is curved about an axis generally transverse to its longitudinal axis.

17 Claims, 2 Drawing Sheets

CORRUGATED STRUCTURAL METAL PLATE

FIELD OF THE INVENTION

The present invention relates generally to structural metal plates and, more particularly, to a corrugated structural metal plate that is curved about an axis transverse to its longitudinal axis for use as a load-bearing member.

BACKGROUND OF THE INVENTION

Structural metal plates are often used as load-bearing members in underground tunnels, culverts and large diameter pipes, for example. Typically, structural metal plates include longitudinally extending sinusoidal corrugations defined by alternating crests and valleys to increase the load-bearing capacity of the plates. The structural metal plates are commonly bent or curved about an axis transverse to the longitudinal axis of the plate so as to have an arcuate curvature in the longitudinal direction. For example, several curved structural metal plates may be connected end-to-end to form a section of a large diameter pipe. Each ring-like section is joined along longitudinal edges of the plates to an adjacent section for forming the desired pipe structure.

During the curving process, one side of the plate is subjected to forces of tension, while the other side is subjected to forces of compression. These forces are separated by a "neutral bending" axis so that forces of tension occur on one side of the neutral bending axis toward the outside of the curve while forces of compression occur on the other side of the neutral bending axis toward the inside of the curve. Generally, corrugated structural plates exhibit optimum elastic and plastic strength when the neutral bending axis of the plate is coextensive with a vertical midplane of the plate. At this position, the distance from the neutral bending axis to the maximum tension fiber and the distance from the neutral bending axis to the maximum compression fiber are the same. To achieve optimum elastic and plastic strength, structural metal plates are typically formed with equal numbers of substantially identical corrugations on each side of the vertical midplane of the plate, thereby locating the neutral bending axis at the vertical midplane of the plate. However, such a design limits the minimum radius to which the plate can be curved without buckling on the compression side.

Thus, there is a need for an improved corrugated structural metal plate that can be curved to a desired minimum radius without buckling on the compression side of the plate.

SUMMARY OF THE INVENTION

The present invention overcomes the foregoing and other shortcomings and drawbacks of corrugated structural metal plates heretofore known. While the invention will be described in connection with certain embodiments, it will be understood that the invention is not limited to these embodiments. On the contrary, the invention includes all alternatives, modifications and equivalents as may be included within the spirit and scope of the present invention.

The corrugated structural metal plate of the present invention is particularly adapted to be curved from a generally flat configuration to include an arcuate curvature in its longitudinal direction without buckling on the compression side of the plate. The structural metal plate of the present invention includes longitudinally extending corrugations that are defined by alternating crests and valleys. In accordance with the principles of the present invention, each crest is in tension when the structural plate is curved about an axis transverse to its longitudinal axis and includes a substantially flat segment extending longitudinally along the crest. Each valley is in compression when the structural plate is curved and includes a substantially flat segment extending longitudinally along the valley. Preferably, a pair of longitudinally extending curved segments are formed along opposite sides of each flat segment formed on the crests and valleys. Each corrugation preferably further includes a longitudinally extending, substantially flat segment formed between and interconnecting the curved segments.

To avoid buckling on the compression side of the plate when the plate is longitudinally curved, the flat segment formed along each valley has a cross-sectional width that is less than a cross-sectional width of the flat segment formed along each crest. The cross-sectional width of the valley flat segments is selected to permit the plate to be curved to a desired minimum radius without buckling. To prevent the neutral bending axis of the structural plate from being displaced away from the vertical midplane and toward the valleys of the corrugations, the plate is formed with an unequal number of crests and valleys. More specifically, the structural plate of the present invention includes at least one more valley flat segment than crest flat segment. As a result of the unequal number of crests and valleys, in conjunction with the relative cross-sectional width dimensions of the crest and valley flat segments, the neutral bending axis remains generally coextensive with the vertical midplane of the plate after the plate has been curved to the desired minimum radius to optimize its elastic and plastic bending strengths.

The above features and advantages of the present invention will be better understood with reference to the accompanying figures and detailed description. It will also be understood that the particular drawings illustrating the invention are exemplary only and are not to be regarded as limitations of the invention.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE PREFERRED EMBODIMENT

Figure 1:
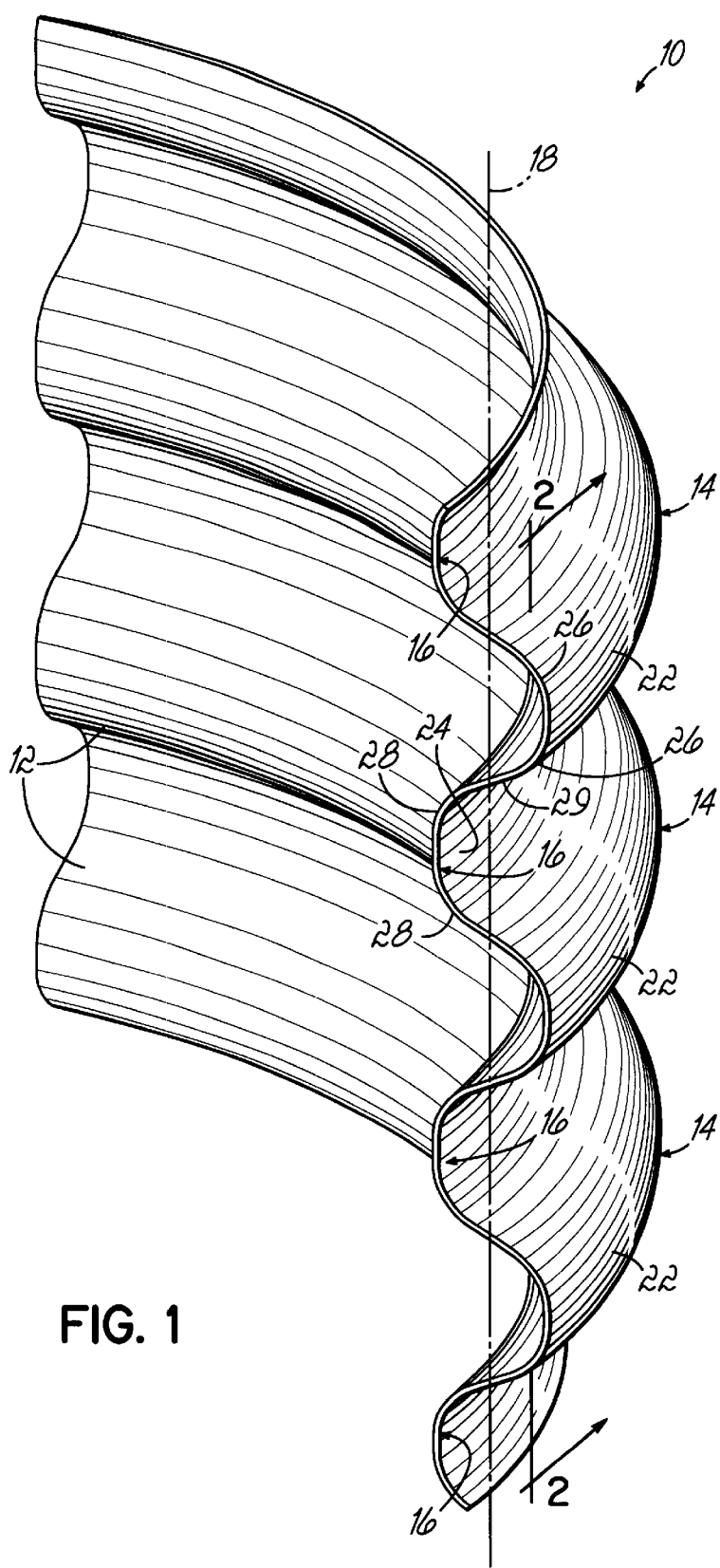
FIG. 1 is a perspective view of a corrugated structural metal plate in accordance with the principles of the present invention.

Referring now to the figures, a corrugated structural metal plate 10 in accordance with the principles of the present invention is shown. The structural plate 10 has a plurality of generally parallel, longitudinally extending corrugations 12 defined by alternating crests 14 and valleys 16. The crests 14 and valleys 16 are located on respective opposite sides of a vertical midplane 18 of the structural plate 10 so that the crests 14 are each located on one side of the vertical midplane 18 and the valleys 16 are each located on the opposite side of the vertical midplane 18. As will be described in more detail below, structural plate 10 is manufactured as a generally flat corrugated plate, and is particularly configured to be curved about an axis generally transverse to its longitudinal axis (see FIG. 1) to a desired minimum radius without buckling on a compression side of the plate 10. The structural plate may have a generally uniform longitudinal curvature as shown in FIG. 1, however other curvatures in the longitudinal direction of the plate 10 are possible as well without departing from the spirit and scope of the present invention.

In accordance with the principles of the present invention, each crest 14 includes a substantially flat segment 22 extending longitudinally along the crest 14, and each valley 16 includes a substantially flat segment 24 extending longitudinally along the valley 16. The corrugations 12 further include a pair of longitudinally extending curved segments 26 formed on opposite sides of each flat segment 22, and a pair of curved segments 28 formed on opposite sides of each flat segment 24. Each corrugation 12 further includes a longitudinally extending, substantially flat segment 29 formed between and interconnecting each of the curved segments 26 and 28.

Figure 2:
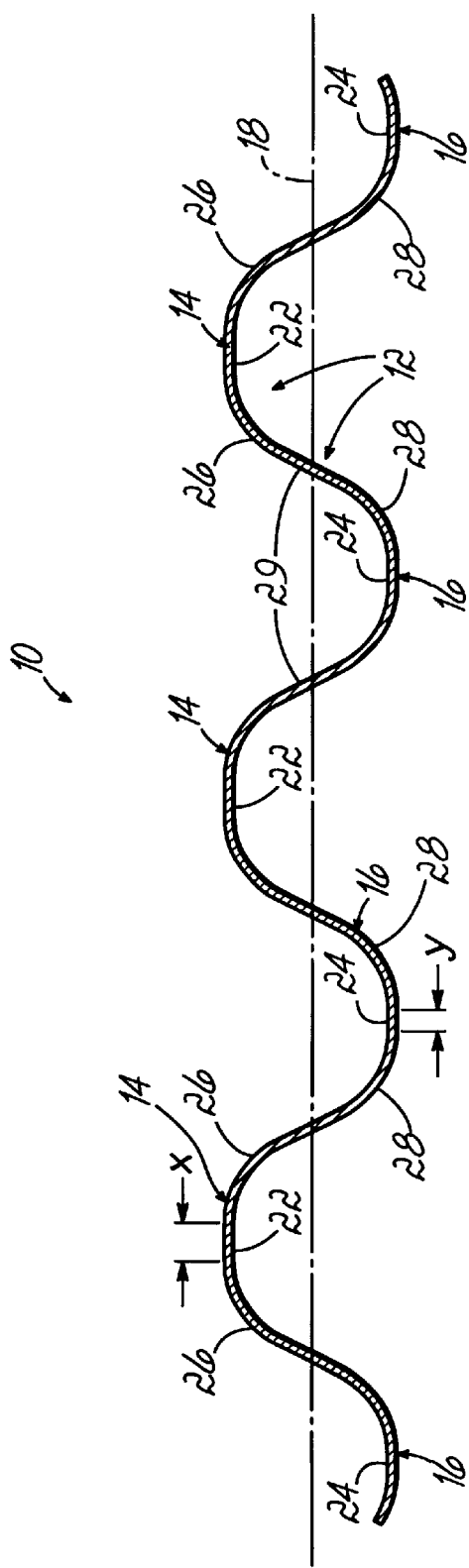
FIG. 2 is a cross-sectional view taken along line 2—2 of FIG. 1.

In accordance with one aspect of the present invention, the cross-sectional width dimension of each valley flat segments 24 is selected so that the plate 10 can be curved about an axis generally transverse to its longitudinal axis to a desired minimum radius without buckling on the compression side of the plate 10. More specifically, the flat segment 22 of each crest 14 on the tension side of plate 10 has a greater cross-sectional width than the cross-sectional width of each flat segment 24 on the compression side of plate 10. As illustrated in FIG. 2, each flat segment 22 has a cross-sectional width "x" and each flat segment 24 has a cross-sectional length "y", wherein "x" is greater than "y". As a result of the shorter cross-sectional width "y" of the valley flat segments 24, the plate 10 can be curved to the desired radius without buckling on the compression side of the plate 10. It will be appreciated by those of ordinary skill in the art that the necessary cross-sectional width dimension of the valley flat segment 24 to prevent buckling in the compression side of plate 10 is generally governed by several factors, including: the depth of the corrugations, the thickness of the plate material, and the desired radius of curvature of the plate.

Corrugated structural metal plates typically have equal numbers of crests and valleys. In a structural plate having equal numbers of crests and valleys, the reduction in the cross-sectional widths of the valley flat segments, relative to the cross-sectional widths of the crest flat segments, would result in the neutral bending axis of the plate being displaced away from the plate's vertical midplane and toward the valleys. As those skilled in the art will readily appreciate, this movement of the neutral bending axis away from the vertical midplane of the plate would reduce the overall elastic and plastic bending strengths of the plate since the respective maximum tension and compression fiber lengths of the plate would not be equal.

In accordance with another aspect of the present invention, the structural plate 10 of the present invention overcomes this problem by providing an unequal number of crests 14 and valleys 16 in the plate 10. More specifically, the structural plate 10 of the present invention includes at least one more valley flat segment 24 than crest flat segment 22 so that the neutral bending axis is maintained generally coextensive with the vertical midplane 18 of the plate 10. Thus, the structural plate 10 of the present invention provides two advantages over known corrugated structural metal plates. First, the structural plate 10 is manufactured with valley flat segments 24 having selected cross-sectional widths that permit the plate 10 to be curved to a desired minimum radius without buckling on the compression side of the plate 10. Second, the structural plate 10 is manufactured with at least one more valley 16 than crest 14 so that the neutral bending axis of the plate is maintained generally at the vertical midplane 18 of the plate 10 to optimize its plastic and elastic bending strengths.

In one embodiment of the present invention, by way of example, the corrugated structural metal plate 10 is configured to be longitudinally curved to a six (6) foot radius without buckling on the compression side of the plate 10. To this end, the plate 10 is formed from twelve (12) gauge steel and has a height of about 5.635 inches, a width between centers of the corrugations 12 of about fifteen (15) inches, a cross-sectional width "y" for each flat segment 24 of about 0.64 inches, a cross-sectional width "x" for each flat segment 22 of about 1.34 inches, a cross-sectional width for each flat segment 29 of about 2.30 inches and a three (3) inch radius of curvature for each of the curved segments 26, 28. In this embodiment, the structural metal plate 10 includes four valleys 16 and three crests 14. Of course, the configuration of the corrugated structural metal plate 10 can be modified for a particular application, in view of the factors described above, without departing from the spirit and scope of the present invention.

While the present invention has been illustrated by the description of varying embodiments thereof, and while these embodiments have been described in considerable detail, it is not the intention of the applicant to restrict or in any way limit the scope of the appending claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

Having described the invention, what is claimed is:

1. A corrugated structural metal plate curved from a generally flat configuration to include an arcuate curvature in its longitudinal direction, comprising:

a plurality of longitudinally extending corrugations defined by alternating crests and valleys;

each of said crests being in tension when said structural plate is curved about an axis transverse to its longitudinal axis and having a substantially flat first segment in transverse cross section extending longitudinally along said crest; and each of said valleys being in compression when said structural plate is curved about the axis transverse to its longitudinal axis and having a substantially flat second segment in transverse cross section extending longitudinally along said valley;

wherein each of said substantially flat second segments has a cross-sectional width that is less than a cross-sectional width of each of said substantially flat first segments.

2. The structural metal plate of claim 1, wherein said plate includes at least one more of said valleys than said crests.

3. The structural metal plate of claim 1 further comprising a pair of longitudinally extending first curved segments in transverse cross section formed along opposite sides of each of said substantially flat first segments.

4. The structural metal plate of claim 3 further comprising a pair of longitudinally extending second curved segments in transverse cross section formed on opposite sides of each of said substantially flat second segments.

5. The structural metal plate of claim 4 further comprising a longitudinally extending, substantially flat third segment in transverse cross section formed between and interconnecting each of said first and second curved segments.

6. The structural metal plate of claim 1 wherein said plate has a generally uniform curvature along its longitudinal axis.

7. The structural metal plate of claim 1 wherein said substantially flat first segments and said substantially flat second segments are substantially parallel.

8. A corrugated structural metal plate curved from a generally flat configuration to include an arcuate curvature in its longitudinal direction, comprising:

a plurality of longitudinally extending corrugations defined by alternating crests and valleys;

each of said crests being in tension when said structural plate is curved about an axis transverse to its longitudinal axis and having a substantially flat first segment in transverse cross section extending longitudinally along said crest and a pair of longitudinally extending first curved segments in transverse cross section formed on opposite sides of said substantially flat first segment; and each of said valleys being in compression when said structural plate is curved about the axis transverse to its longitudinal axis and having a substantially flat second segment in transverse cross section extending longitudinally along said valley and a pair of longitudinally extending second curved segments in transverse cross section formed on opposite-sides of said substantially flat second segment;

wherein each of said substantially flat second segments has a cross-sectional width that is less than a cross-sectional width of each of said substantially flat first segments.

9. The structural metal plate of claim 8, wherein said plate includes at least one more of said valleys than said crests.

10. The structural metal plate of claim 8 further comprising a longitudinally extending, substantially flat third segment in transverse cross section formed between and interconnecting each of said first and second curved segments.

11. The structural metal plate of claim 8 wherein said plate has a generally uniform curvature along its longitudinal axis.

12. A method of forming a corrugated structural metal plate, comprising the steps of:

forming a plurality of longitudinally extending corrugations defined by alternating crests and valleys;

forming a substantially flat first segment in transverse cross section extending longitudinally along each of said crests and having a first cross-sectional width;

forming a substantially flat second segment in transverse cross section extending longitudinally along each of said valleys and having a second cross-sectional width, wherein said second cross-sectional width is less than said first cross-sectional width; and curving said plate about an axis transverse to its longitudinal axis so that each of said crests is in tension and each of said valleys is in compression.

13. The method of claim 12 further comprising:

forming at least one more of said valleys than said crests.

14. The method of claim 12 further comprising:

forming a pair of longitudinally extending first curved segments in transverse cross section along opposite sides of each of said substantially flat first segments.

15. The method of claim 14 further comprising:

forming a pair of longitudinally extending second curved segments in transverse cross section along opposite sides of each of said substantially flat second segments.

16. The method of claim 15 further comprising:

forming a longitudinally extending, substantially flat third segment in transverse cross section between and interconnecting each of said first and second curved segments.

17. The method of claim 12 further comprising:

curving said plate generally uniformly about the axis transverse to its longitudinal axis.

* * * * *